United States Patent
Lengsfeld

(10) Patent No.: US 8,202,458 B2
(45) Date of Patent: Jun. 19, 2012

(54) METHOD FOR PRODUCING PROFILE PARTS

(75) Inventor: Hauke Lengsfeld, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/532,191

(22) PCT Filed: Mar. 27, 2008

(86) PCT No.: PCT/EP2008/053628
§ 371 (c)(1),
(2), (4) Date: Sep. 24, 2009

(87) PCT Pub. No.: WO2008/119730
PCT Pub. Date: Oct. 9, 2008

(65) Prior Publication Data
US 2010/0072654 A1    Mar. 25, 2010

Related U.S. Application Data

(60) Provisional application No. 60/920,878, filed on Mar. 30, 2007.

(30) Foreign Application Priority Data

Mar. 30, 2007 (DE) .......................... 10 2007 015 518

(51) Int. Cl.
*B29C 69/00* (2006.01)
(52) U.S. Cl. ................... 264/241; 264/257; 264/258
(58) Field of Classification Search ............ 264/101, 264/257, 258, 241
See application file for complete search history.

(56) References Cited

U.S. PATENT DOCUMENTS

| 4,576,849 A | 3/1986 | Gardiner |
| 5,229,562 A * | 7/1993 | Burnett et al. ............... 219/602 |

(Continued)

FOREIGN PATENT DOCUMENTS

DE    2334645    1/1975

(Continued)

OTHER PUBLICATIONS

F.C. Campbell, "Manufacturing Processes for Advanced Composites", The Boeing Company, 2004, pp. 143, 145.

*Primary Examiner* — Joseph Del Sole
*Assistant Examiner* — James Sanders
(74) *Attorney, Agent, or Firm* — Greer, Burns & Crain, Ltd.

(57) ABSTRACT

The present invention relates to a method for producing profile parts, each having an L-shaped cross-section, or an assembled profile part having, in particular, a T-shaped cross-section. For this purpose a lay-up made of composite fiber material is initially placed on a forming tool. In a further step, the lay-up is deformed by the forming tool to form a profile having a preferably U-shaped cross-section, the profile thus exhibiting the book effect at each opposite end. In a further step, the profile is preferably cut in the longitudinal direction in order to produce two profile parts. The idea on which the invention is based is to allow the layers in the lay-up to shift during the deformation process and subsequently to produce a substantially right-angled chamfered end on the profile parts by means of a cutting process. The disadvantageous formation of corrugations and complex clamping of the lay-up are thus avoided.

11 Claims, 3 Drawing Sheets

U.S. PATENT DOCUMENTS

| | | | |
|---|---|---|---|
| 2007/0039284 A1* | 2/2007 | Munoz Royo et al. | 52/733.2 |
| 2008/0110563 A1* | 5/2008 | Engwall et al. | 156/285 |

FOREIGN PATENT DOCUMENTS

| | | |
|---|---|---|
| DE | 69301162 | 5/1996 |
| DE | 60009259 | 12/2004 |
| EP | 0749825 | 12/1996 |
| EP | 1609548 | 12/2005 |
| WO | WO 96/06726 | 3/1996 |

* cited by examiner (A)

METHOD FOR PRODUCING PROFILE PARTS

CROSS REFERENCE TO RELATED APPLICATIONS

This application claims the benefit of U.S. Provisional Application No. 60/920,878, filed Mar. 30, 2007 and German patent application No. 10 2007 015 518.4, filed Mar. 30, 2007, the entire disclosure of which is herein incorporated by reference.

FIELD OF THE INVENTION

The present invention relates to a method for producing profile parts, in particular in the fields of aeronautics and astronautics.

The present invention and the problem on which it is based will be described in more detail with respect to the production of T-shaped profiles, although they are applicable to any desired profile parts.

Stringers in the form of T-shaped profiles are widely used in the aircraft industry. It is therefore an objective to produce said stringers as efficiently and as cost-effectively as possible.

A method for producing T-shaped stringers known internally in the company of the applicant provides the following steps:

A lay-up, which is constructed in particular by means of an automatic tape laying means and is made of tape, which is composed in particular of unidirectional carbon fibres, in a resin matrix is initially placed on a forming tool.

In a further step, the lay-up is rigidly clamped at one end onto the forming tool, the other end of the lay-up projecting over an edge of the forming tool.

In a further step, the lay-up is heated, in particular by means of a solarium.

In a subsequent step, the lay-up is wrapped together with the forming tool in a vacuum bag and a vacuum is applied. This results in the projecting end being rigidly positioned on the forming tool. The lay-up is thus bent around the edge in a comparatively tight radius, forming an L-shaped profile part.

This leads to what is known as the "book effect" at the other, unclamped end of the lay-up, which causes, depending on the radius, a relative shift of individual layers or fibres in the bonded fabric. Fibres or layers which are situated on the outside in relation to the radius are shortened to a greater extent, similar to the open pages of a book, when viewed from the unclamped end of the lay-up.

Clamping has the function of preventing a relative shift of the individual layers or fibres in the clamped end, since this end is intended to act as the foot of the stringer. The book effect or subsequent machining of the fibre portions affected by the book effect is disadvantageous for a stringer foot for reasons of strength and is thus to be avoided.

The steps described at the outset are repeated for a further lay-up using a further forming tool.

In a further step, the two forming tools are driven against each other in such a way that the L-shaped profile parts formed are pressed together at each of their ends affected by the book effect to form an assembled T-shaped profile part.

In a subsequent step, the arrangement composed of the two forming tools and the assembled T-shaped profile part is cured in the autoclave.

In the previously described method, it has been found to be disadvantageous that, firstly, clamping results in a comparatively laborious method. Secondly, clamping causes corrugations to form in a region of the lay-up downstream of the clamp. This causes deterioration in the quality of the T-shaped profile part which is to be produced, in particular with respect to strength.

SUMMARY OF THE INVENTION

It is therefore an object of the present invention to provide a method for producing profile parts without the clamping procedure described above.

A method for producing profiles with the features of claim 1 is provided according to the invention.

Accordingly, a method with the following steps for producing profile parts in the fields of aeronautics and astronautics is provided. A lay-up made of composite fibre material is initially placed on a forming tool. In a further step, the lay-up is deformed by means of the forming tool in order to form a profile which is bent at least once, with a book effect occurring at each opposing end of the profile. In a further step, the profile, which is bent at least once, is severed in the longitudinal direction to form at least two individual profile parts.

The idea on which the invention is based is to allow a relative shift of the fibres or layers in the lay-up and not to prevent said shift by clamping accordingly. This means firstly that the step of clamping can be eliminated and secondly that the formation of corrugations mentioned in the introduction is avoided. The desired end without the book effect is produced according to the invention by the profile being severed in the longitudinal direction, i.e. being cut in two, for example. Two profile parts are thus formed, having at one end, in the transverse direction, a smooth cut edge, preferably at right angles, and the book effect at the other end. The profile parts thus formed can be cured by themselves and subsequently be fixed as stringers to a skin in order to reinforce said skin. Fastening can advantageously be achieved with the end of the profile part which is not subject to the book effect.

Consequently, a simplified method, which also results in improved quality of the produced profile parts, is provided according to the invention.

Advantageous improvement and development of the method according to the invention will emerge from the subclaims.

The term "lay-up made of composite fibre material" is to be understood in the present document as woven fabrics, bonded fabrics, in particular tape bonded fabrics which are constructed in layers and/or have a plurality of fibres piled on top of one another in the direction of the thickness. The term "lay-up made of composite fibre material" preferably refers to a layer construction of tape material which comprises fibre layers, which are aligned and are laid down on top of one another, and which is constructed in an optimised manner with regard to the loading of the profile parts to be produced. The "lay-up made of composite fibre material" preferably further comprises carbon fibres, thermoplastic polymer fibres, metal wires or metal woven fabrics or metal bonded fabrics, in particular copper wire bonded fabrics and mixtures thereof. Epoxy resins are particularly suitable for the matrix. The lay-up is preferably preimpregnated, i.e. the matrix introduced cures only in part prior to the lay-up being placed on the forming tool.

The term "sever" refers to cutting, in particular with a CNC milling cutter or a CNC saw. However, other cutting methods, such as water jet cutting, are also suitable. "Severing the profile in the longitudinal direction" means that the severing process has at least one spatial component in the longitudinal direction. This preferably includes, for example, severing diagonally.

The term "profile" is to be understood in the present document as a component which extends in a spatial direction, referred to in the following as the longitudinal direction, with a substantially unchanging cross-section. The term "profile part" is to be understood as a component produced therefrom by severing the profile in the longitudinal direction. The term "assembled profile part" is to be understood in the present document as a component formed from at least two profile parts, the profile parts being connected to one another in the transverse direction with a material connection in particular.

According to a preferred development of the invention, the profile is formed with a cross-section which is U-shaped in portions, and the profile parts are each formed with a cross-section which is L-shaped in portions. The profile is particularly preferably formed as a U-shaped profile and the profile parts are particularly preferably formed as L-shaped profile parts. By cutting along the line of mirror symmetry of the U, two mirror-symmetrical L-shaped profile parts can be simply produced from a U-shaped profile.

According to a further preferred embodiment of the invention, the profile parts are connected to one another at a portion not exhibiting the book effect in order to form the assembled profile part. In this way, a T-shaped profile part, for example, can be produced in a very simple manner from two L-shaped profile parts, the T-shaped profile part thus not exhibiting the book effect in the foot region and being able to be connected by its foot to a skin without any difficulty since clean cut edges are provided. The web exhibiting the book effect of the T-shaped profile part can easily be reworked in terms of production, for example with a CNC milling cutter, if desired. In the case of L-shaped profile parts, the term "portion without the book effect" refers to the leg, on the end of which a book effect occurs. The L-shaped profile part may, for example, have equal or unequal sides.

According to a further preferred development of the invention, the two individual profile parts are each supported by a half of the forming tool. This results in the advantage that the two individual profile parts, after being severed, can be handled independently of one another on the respective tool halves, for example transported to an autoclave. It is of course also possible for more than two profile parts to be supported on each tool half.

According to a further preferred embodiment of the invention, the tool halves are rotated by 180° after being severed. In this way, the portions of the individual profile parts exhibiting the book effect can easily be positioned next to one another and subsequently connected to one another to form the assembled profile part.

In a further preferred development of the invention, the individual profile parts are connected to form the assembled profile part by pressing together the rotated tool halves. Pressing together the parts in this way produces an assembled profile part, adjacent fibres of the respective profile parts being tightly arranged or interlocking, or a homogenous resin distribution being achieved, in the assembled profile part.

According to a further preferred embodiment of the invention, the profile is severed along a line of mirror symmetry of said profile. Two identical profile parts, which can, for example, be very simply combined to form a T-shaped profile part, can thus advantageously be produced. According to a further preferred embodiment of the invention, heat is supplied to deform the lay-up, in particular by inductively heating the forming tool. The heat supplied softens the resin matrix present in the lay-up and thus enables said lay-up to be easily deformed with little force expenditure. An inductively heated forming tool allows a uniform, high heat input into the lay-up to be achieved, in particular due to the fact that the lay-up is in contact with the forming tool. In the known heating process using a solarium, heat transfer is only possible by means of radiation. Furthermore, an inductively heated forming tool is characterised by heating very rapidly to a comparatively high temperature. It is thus possible to shorten the process time for producing the profile parts. Furthermore, a more uniform penetration of heat through the lay-up results in improved flow of the resin matrix contained in the lay-up. This has an advantageous effect on the component quality, in particular with respect to strength.

In a further preferred embodiment of the invention, in order to deform the lay-up, said lay-up is wrapped, together with the forming tool, with a diaphragm so as to be vacuum-tight, and a vacuum is subsequently applied. The diaphragm may in this case be formed as a single diaphragm, said diaphragm enclosing the lay-up including the forming tool, and the lay-up being in direct contact with the forming tool. The diaphragm may also be formed as a double diaphragm, the lay-up being arranged between the two diaphragms, one of the diaphragms thus resting on the forming tool, with its lower side and being in contact with the lay-up with its upper side. The vacuum is produced between the forming tool and the lower diaphragm in order to deform the lay-up. In the double diaphragm, the lay-up itself is preferably also under a vacuum.

In a further preferred development of the invention, the lay-up is held by holding means at least while being deformed, the holding means allowing a shift in the layers and/or fibres in the lay-up. The holding means thus only prevents the lay-up from slipping on the forming tool, which can be caused, for example, by different deformation forces resulting from the vacuum. The fibres or the layers in the lay-up can thus also shift freely in the region between the holding means and the forming tool in which the lay-up is held in such a way that the formation of corrugations mentioned at the outset is advantageously prevented.

According to a further preferred embodiment of the invention, the profile parts are cured, in particular in an autoclave. This step can be carried out, for example, after the profile has been severed, the profile parts then being cured separately. The curing process can also take place after the profile parts have been joined to one another or to other profile parts. As a result, a cured component is produced which can, for example, be connected to a skin to reinforce said skin.

In a further preferred embodiment of the present invention, the lay-up is formed as a tape bonded fabric, in particular a mechanically pre-machined tape bonded fabric. Tape bonded fabrics can be produced very efficiently, in particular by using an automatic tape laying means, there being a great deal of freedom with regard to the alignment of the fibres in the component to be produced. The tape is preferably composed of unidirectional carbon fibres which are impregnated with a resin matrix. It is thus possible to achieve optimised force absorption in the profile part to be produced in a very simple manner.

BRIEF DESCRIPTION OF THE DRAWINGS

The invention is described in greater detail in the following with reference to an embodiment and the appended drawings, in which.

DETAILED DESCRIPTION OF THE DRAWINGS

Figure 1:
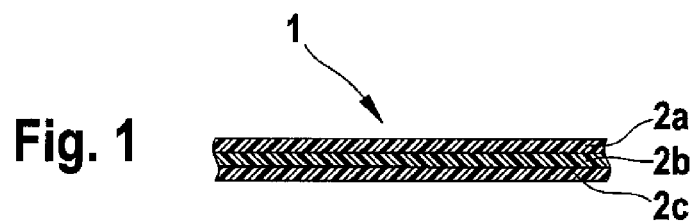
FIG. 1 schematically shows a method status of a method according to an embodiment of the present invention.

In the figures, like reference numerals refer to like or functionally like components unless otherwise stated.

FIG. 1 shows a status of the method during the provision of a lay-up 1. As is schematically shown, the lay-up is assembled, for example, from three tape layers 2a, 2b, 2c. Each layer comprises preferably unidirectionally aligned carbon fibres which are pre-impregnated with an epoxy resin matrix. In this case, the fibres extend within each of the layers 2a, 2b, 2c at different angles, for example at 45°, to the vertical on the plane of the page in FIG. 1.

Figure 2:
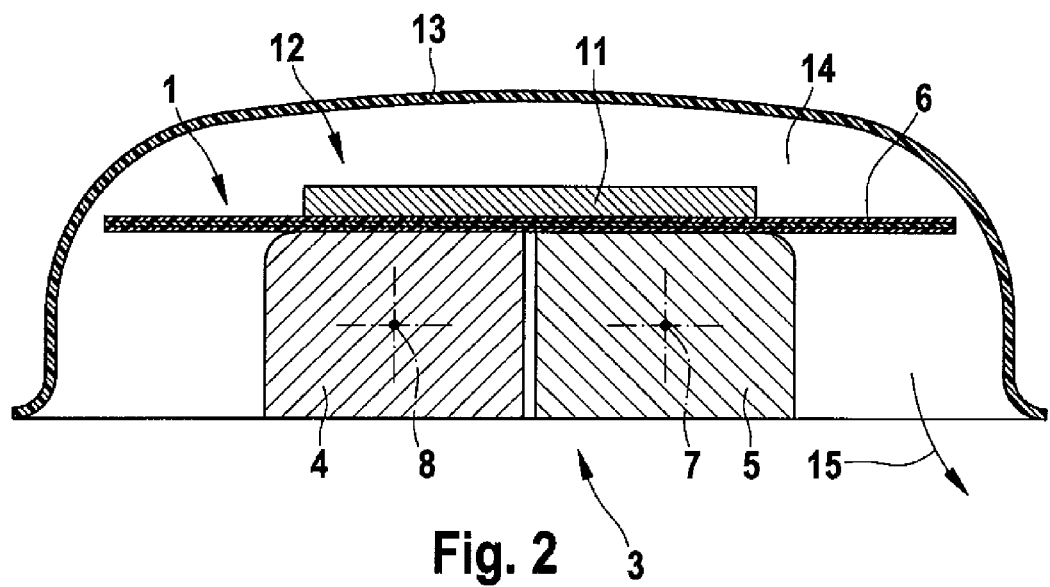
FIG. 2 shows a further method status according to the embodiment.

The lay-up 1 is subsequently placed on a forming tool 3 as shown in FIG. 2. The forming tool 3 is assembled from, for example, two tool halves 4, 5. The longitudinal direction of the lay-up 1 is thus aligned perpendicular to the plane of the page in FIG. 1 to 6. The lay-up is preferably aligned centrally, with regard to its cross-section 6, on the forming tool 3.

The halves 4, 5 are mounted so as to be rotatable about axes of rotation 7, 8 which extend perpendicularly to the plane of the page in FIG. 2 to 6.

After the lay-up 1 has been placed on the forming tool 3, a holding means 11 is preferably arranged on the forming tool in such a way as to prevent slippage of the lay-up 1 relative to the forming tool 3 by holding the lay-up 1 with a frictional connection between itself and the forming tool 3.

In a further step, the entire arrangement 12 composed of the forming tool 3, the lay-up 1 and the holding means 11 is wrapped in a vacuum-tight manner in a schematically indicated vacuum bag or diaphragm 13.

In a further step, each of the tool halves 4, 5 is preferably inductively heated. The heated tool halves 4, 5 then continuously provide the heat thereof to the lay-up 1, which causes said fabric to become soft.

In a further step, a vacuum is applied to the interior 14 enclosed by the diaphragm 13, air being removed from the interior 14, which is indicated by the arrow 15.

Figure 3:
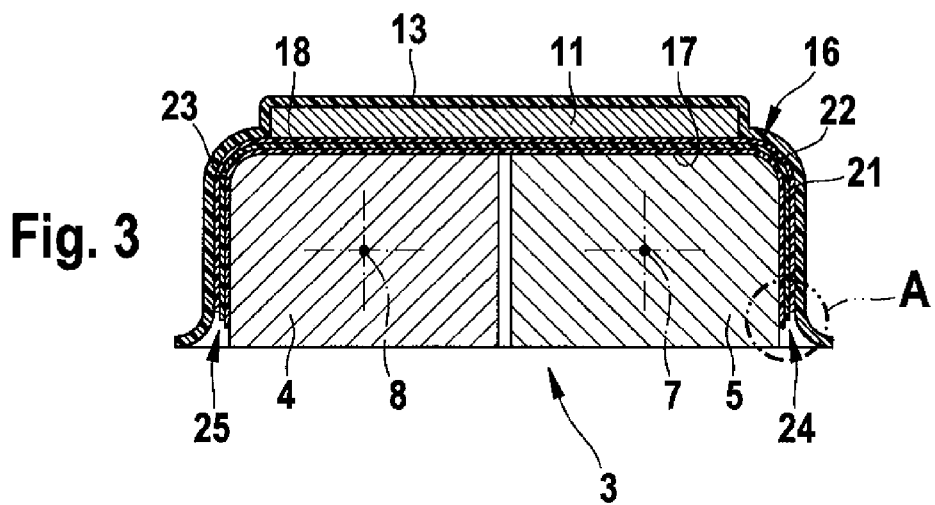
FIG. 3 shows another method status according to the embodiment.

This causes the lay-up 1 to be deformed to form the profile 16, as shown in FIG. 3. The profile 16 thus has an inner contour 17 which corresponds to the outer contour 18 of the two tool halves.

Figure 3A:
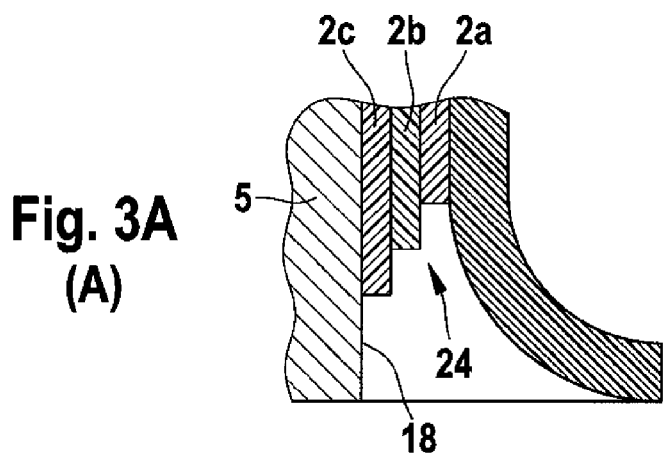
FIG. 3A is a considerably enlarged view of A from FIG. 3.

The profile 16 produced has a U-shaped cross-section 21 which extends in the longitudinal direction, i.e. perpendicular to the plane of the page of FIG. 3. The U-shaped cross-section 21 is bent twice, which is achieved by the radii 22, 23 of the respective tool halves 4, 5. Due to the deformation of the lay-up 1 about the radii 22, 23, the layers 2a, 2b, 2c shift relative to one another, which in turn causes the book effect at the opposing ends 24, 25 of the cross-section 21 as shown schematically for the end 24 in the partial detail A in FIG. 3, which is illustrated in FIG. 3A.

Figure 4:
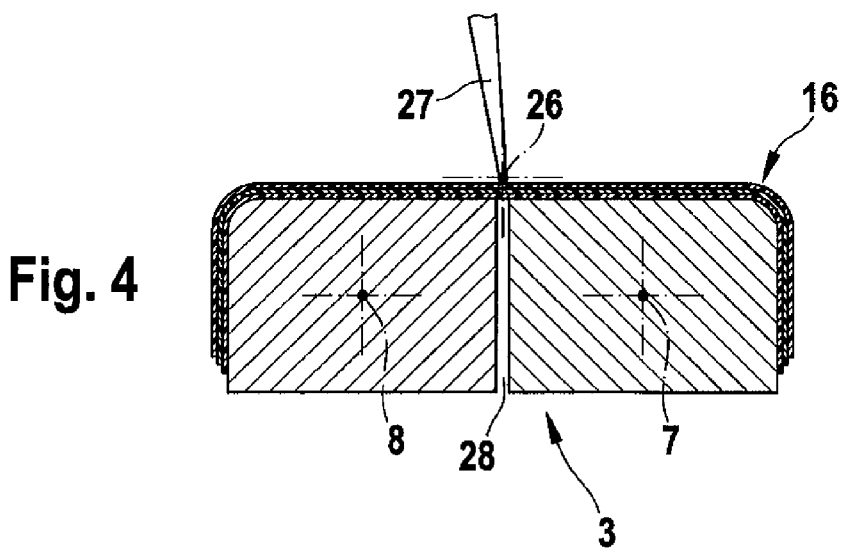
FIG. 4 is another method status according to the embodiment.
Figure 5:
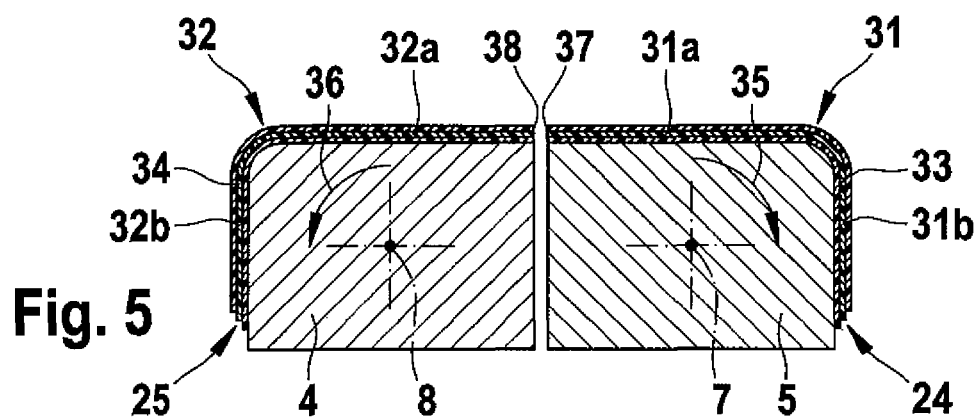
FIG. 5 is another method status according to the embodiment.

In a further step, the diaphragm 13 and the holding means 11 are removed. This status of the method is shown in FIG. 4. In a further step, the profile 16 is then cut along its line of mirror symmetry 26 which extends perpendicular to the plane of the page along the profile 16 by means of a preferably computer controlled cutting tool 27. In this case, the cutting tool 27 particularly preferably extends into a gap 28 between the two tool halves 4, 5 while cutting. The profile 16 is severed in the cutting process into two profile parts 31, 32, each having an L-shaped cross-section 33, 34.

In a further step, the two tool halves 4, 5 are each pivoted by 180° about the axes of rotation 7 or 8. This is indicated by the arrows 35, 36 in FIG. 5. The rotated tool halves 4, 5 are shown in FIG. 6.

As a result of the cutting procedure, the profile parts 31, 32 have ends 37 or 38, which oppose the respective end 24, 25 formed with the book effect and which are each chamfered substantially at right angles and are formed with a smooth cut face. Each profile part 31 or 32 is composed, according to the present embodiment, of a long leg 31a, 32a and a short leg 31b, 32b. Each of the short legs 31b, 32b thus comprises the end 24 or 25 exhibiting the book effect and the long legs 31a, 32a comprise the ends 37 or 38 not exhibiting the book effect.

Figure 6:
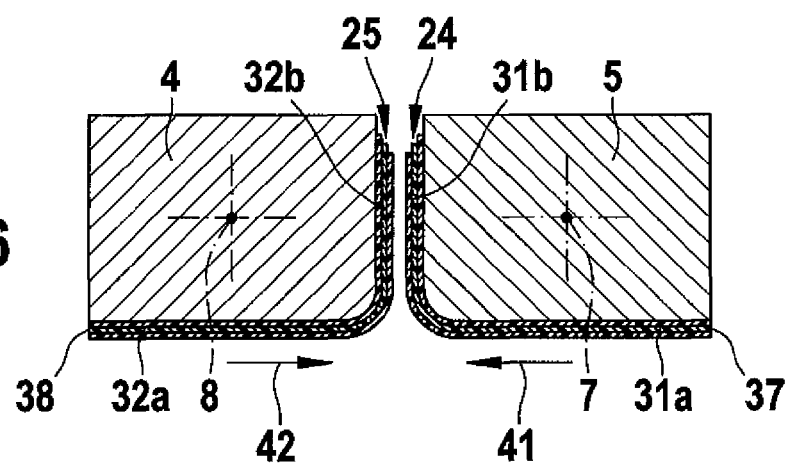
FIG. 6 is another method status according to the embodiment.

In a further step subsequent to the status of the method shown in FIG. 6, the two tool halves 4, 5 are each driven against one another in the direction of the arrows 41, 42.

The two short legs 31b, 32b are pressed together by driving the two tool halves 4, 5 against one another. As a result, the composite fibre material of the short legs 31b, 32b mixes together at least in part, resulting in a very homogenous distribution of resin in the region in which the two short legs 31b, 32b adjoin one another.

Figure 7:
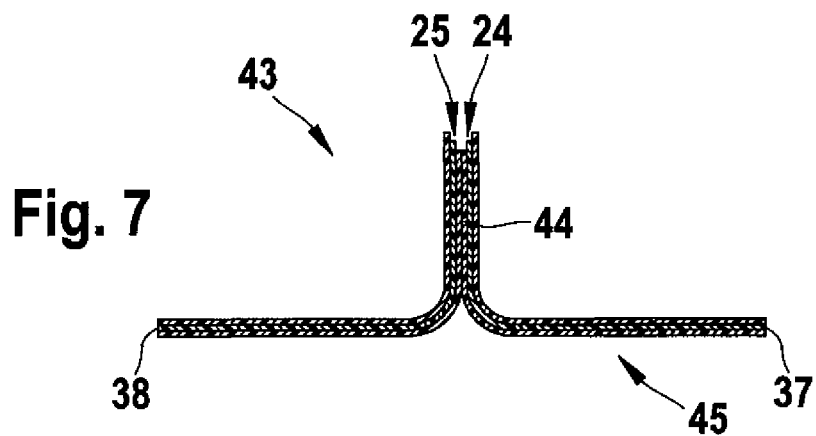
FIG. 7 is another method status according to the embodiment.

In a further step, the arrangement from FIG. 6, together with the tool halves 4, 5 which have been driven against one another, are preferably wrapped in a vacuum bag (not shown) and cured in an autoclave (not shown) to form the T-shaped profile part 43 shown in FIG. 7.

As a result, a T-shaped profile part 43 is produced, as shown in FIG. 7. According to the present embodiment, the T-shaped profile part 43 comprises a web 44 and a foot 45. The foot 45 is thus provided with the ends 37, 38 which are not subject to the book effect and are chamfered substantially at right angles. In a further step, the foot 45 can be fixed to a skin (not shown) without difficulty. Force can then be unrestrictedly transferred from the skin to the T-shaped profile 43 via the ends 37, 38, which are chamfered at right angles. The ends 37, 38 can also satisfy any requirements with respect to the accuracy of their configuration, since the cutting procedure from FIG. 4 can be controlled very precisely.

The ends 24, 25 or the web 44 exhibiting the book effect may, if desired, be calendered with an appropriate milling cutter.

Although the present invention has been described in the present document with reference to a preferred embodiment, said invention is not restricted thereto and can be modified in a variety of ways.

For example, the profile 16 may have a hat-shaped, C-shaped or other cross-section which is bent at least once. In addition, the profile parts 31, 32 may also be shaped differently, for example be Z-shaped. Moreover, the profile parts 31, 32 can be fixed to one another at any desired leg, i.e. they can also be fixed at the long legs 31a, 32a.

The present invention relates to a method for producing profile parts with an L-shaped cross-section or an assembled profile part having, in particular, a T-shaped cross-section. For this purpose, a lay-up made of composite fibre material is initially placed on a forming tool. In a further step, the lay-up is deformed by means of the forming tool to form a profile having a preferably U-shaped cross-section, the profile thus exhibiting the book effect at opposite ends. In a further step, the profile is preferably cut in order to produce two profile parts. The idea on which the invention is based is to allow the layers in the lay-up to shift during deformation and subsequently to produce, by means of a cutting procedure, a right-angled chamfered end which has a smooth cut face on the profile parts. In this way, the disadvantageous formation of corrugations or complex clamping of the lay-up is dispensed with.

LIST OF REFERENCE NUMERALS 1 lay-up
2a layer
2b layer
2c layer
3 forming tool
4 tool half
5 tool half
6 cross-section
7 axis of rotation
8 axis of rotation
11 holding means
12 arrangement
13 diaphragm
14 interior
15 arrow
16 arrow
17 inner contour
18 outer contour
21 cross-section
22 radius
23 radius
24 end
25 end
26 line of mirror symmetry
27 cutting tool
28 gap
31 profile part
31a long leg
31b short leg
32 profile part
32a long leg
32b short leg
33 cross-section
34 cross-section
35 arrow
36 arrow
37 end
38 end
41 arrow
42 arrow
43 T-shaped profile part
44 web
45 foot

The invention claimed is:

1. A method for producing profile parts, in particular in the fields of aeronautics and astronautics, comprising the following steps:
   placing a lay-up made of composite fibre material on a forming tool;
   deforming the lay-up by means of the forming tool to form a profile which is bent at least once, a book effect occurring at opposite ends in the transverse direction of the profile;
   cutting the profile, which is bent at least once, in the longitudinal direction of said profile to form at least two individual profile parts;
   connecting the at least two individual profile parts to one another at a portion exhibiting the book effect in order to form an assembled profile part; and
   curing the assembled profile part.

2. The method according to claim 1, wherein the profile, which is bent at least once, is formed with a cross-section which is U-shaped at least in portions, and the at least two individual profile parts are each formed with a cross-section which is L-shaped at least in portions.

3. The method according to claim 1, wherein the at least two individual profile parts are each supported by a half of the forming tool.

4. The method according to claim 3, wherein the tool halves are rotated by 180° after the cutting process.

5. The method according to claim 4, wherein it is provided that the at least two individual profile parts are connected to form the assembled profile part by means of the rotated tool halves pressing against one another.

6. The method according to claim 1, wherein the profile is cut out along a line of mirror symmetry of said profile, which is bent at least once.

7. The method according to claim 1, wherein heat is supplied in order to deform the lay-up, in particular by inductively heating the forming tool.

8. The method according to claim 1, wherein, in order to deform the lay-up, said lay-up, together with the forming tool, is wrapped with a diaphragm so as to be vacuum-tight, and a vacuum is subsequently applied.

9. The method according to claim 1, wherein the lay-up is held by holding means, at least during the deformation process, the holding means allowing the layers and/or fibres in the lay-up to shift.

10. The method according to claim 1, wherein the at least two individual profile parts and/or the assembled profile part are cured, in particular in an autoclave.

11. The method according to claim 1, wherein the lay-up is formed as a tape bonded fabric, in particular a mechanically premachined tape bonded fabric.

* * * * *